United States Patent [19]

Lynch

[11] 4,262,158

[45] Apr. 14, 1981

[54] PARAMELTER-BATCH FEED CONTROLLED BY CRUST TEMPERATURE AND MELTER POWER BY LINER TEMPERATURE FOR REGULATION OF HEAD

[75] Inventor: Francis L. Lynch, Newark, Ohio

[73] Assignee: Owens-Corning Fiberglas Corporation, Toledo, Ohio

[21] Appl. No.: 941,877

[22] Filed: Sep. 13, 1978

[51] Int. Cl.$^3$ .................... C03B 5/02; F27D 21/00; H05B 3/60

[52] U.S. Cl. ............................................. 13/6; 13/24

[58] Field of Search .................................. 13/6, 24

[56] References Cited

U.S. PATENT DOCUMENTS

| | | |
|---|---|---|
| 2,625,658 | 1/1953 | Robinson . |
| 3,192,302 | 6/1965 | Keefer ........................................ 13/6 |
| 3,836,689 | 9/1974 | Holler et al. . |
| 3,980,460 | 9/1976 | Nelson et al. .......................... 13/6 X |

Primary Examiner—Roy N. Envall, Jr.
Attorney, Agent, or Firm—Ronald C. Hudgens; Charles F. Schroeder; Joel I. Rosenblatt

[57] ABSTRACT

The hydraulic head of a cold top electric furnace for melting of batch, such as glass batch, employing an electric resistance heater, is electrically controlled by sensed temperature. The temperature is measured below the batch layer or crust at the area of interface transition from the solid material to the liquid melted state. A second sensor is placed within the furnace liner below and adjacent the screen heater within the molten material. The temperature signals at either of the locations are related to the hydraulic head within the furnace. The head is controlled responsive to these temperature signals by either adding additional material or diminishing the amount of material being added to the furnace.

14 Claims, 5 Drawing Figures

PARAMELTER-BATCH FEED CONTROLLED BY CRUST TEMPERATURE AND MELTER POWER BY LINER TEMPERATURE FOR REGULATION OF HEAD

FIELD OF THE INVENTION

The field of this invention is furnaces used to melt solids and, in particular, to directly melt dry particulate batch material, and more particularly to directly melt glass batch material.

BACKGROUND OF THE PRIOR ART

A problem faced by the prior art was measuring the hydraulic head within an electric furnace in which dry particulate batch material is directly melted, wherein the liquid level of the furnace could not be sensed, and wherein the level of the solid-to-liquid transition state could not be determined nor its effect on the hydraulic head predicted.

The prior art solution to this problem was to inject bubbles through the bottom of the furnace. The entrance pressure of the bubbles was sensed and this pressure was then used as an indication of the hydraulic head within the furnace.

However, this method of measuring the hydraulic head has the obvious disadvantage of introducing extraneous material into the furnace, as well as cooling the furnace and disturbing the furnace process.

A co-pending application Ser. No. 864,429, filed Dec. 27, 1977, and assigned to the common assignee, discloses an ultrasonic batch level sensor to regulate the batch thickness.

SUMMARY OF THE INVENTION

A furnace is constructed with an opening at its upper end, a screen heater disposed across that opening and connected to an electric power source, and an exit port through which the melted liquid is withdrawn from the furnace.

A solid material is added to the furnace through its upper end. This solid material may be a particulate material such as powder or granular glass batch material or may be any other heat-softenable material which is commonly melted in a cold top electric furnace of this type. The batch material forms a layer on the top surface of the furnace and is heated by the screen heating element connected to the electrical power supply.

The hydraulic head is produced by the melted material within the furnace, the solid material added to the furnace at its upper opening, and the interface layer existing between the solid material and the melted material where the solid undergoes a physical transformation from solid to liquid by heating.

In a furnace of this type, the hydraulic head may be controlled by controlling the amount of batch added to the furnace as material is withdrawn from the exit port. The process in the furnace requires that batch be added in the proper amounts to maintain a batch or crust layer at a particular thickness. This crust layer provides insulation and maintains the heat in the melt below the crust at a predetermined temperature.

The flow of the material through the furnace is a function of the viscosity of the material, which is a function of the temperature of the melted material within the furnace, and of the hydraulic head in the furnace.

Since the batch crust provides an insulating layer, changes in crust thickness will cause changes in melt temperature below the crust.

The temperature below the batch crust area, particularly in the interface zone where the solid material is transformed into liquid, can be used to indicate the amount of crust above the zone and the amount of crust contributing to the hydraulic head.

The temperature in the furnace liner will affect the viscosity, as well as the flow rate, and provide an indication of the hydraulic head level. By controlling the screen heater power in response to the temperature at the screen heater, the melt viscosity, melt flow rate and hydraulic head can be controlled.

This invention, then, provides three methods of measuring and regulating the hydraulic head within a para-melt furnace.

A first method is where the temperature immediately under the crust in the interface zone is sensed, and the rate of batch feed is controlled responsive to that temperature to regulate the thickness of the batch crust and the hydraulic head.

The second method is to sense the temperature at the screen heater and control the power and heat to the furnace responsively to control the viscosity, flow rate and hydraulic head.

A third method is to use the first two methods cooperatively, either alternately or simultaneously.

DESCRIPTION OF THE PREFERRED EMBODIMENT

The principles of this invention are now discussed with reference to the following preferred embodiment.

Figure 1:
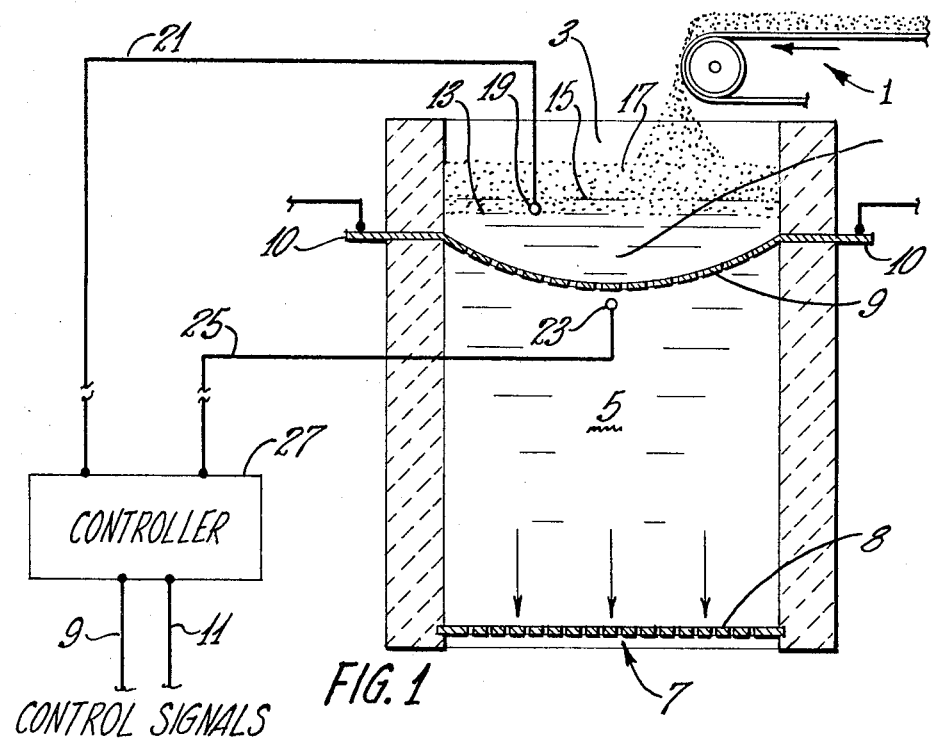
FIG. 1 is a drawing of the temperature sensors arranged in the furnace.

In FIG. 1, an electric melting furnace is shown having an inlet port 3, a liner area 5, and an exit port 7 which may contain a bushing 8 for drawing off melted material, such as glass. A screen heater 9 is arranged across the throat of the furnace liner and connected to a suitable power supply through terminals 10. A means shown as 1 is placed adjacent to the entrance port for adding batch material. Any suitable means known in the art for adding particulate material to the furnace may be used. The batch material is a particulate and may be powdered or granular glass batch material.

The furnace in operation has a fluid level at 13, and an interface zone 15 existing above the fluid level and below the crust of solid material recently added to the furnace 17. As is well known in the art, the batch material is constantly being added to the furnace as the furnace melt within the output is being drawn off at the bushing 8.

Figure 1B:
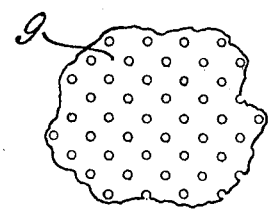
FIG. 1b is a top view of the melter screen heater.

A small section of the screen heater, which is shown in top view in FIG. 1b, is shaped to allow the particles of the batch to pass through the screen as they pass into their melted state.

Because of the batch crust positioned on the liquid, it is difficult to measure the precise level of the liquid within the furnace or the depth and quality of the interface zone. It is therefore not possible to measure the hydraulic head by conventional means. As stated above, the prior art technique was to inject bubbles into the furnace and measure the entrance pressure of the bubbles.

The object of this invention is to maintain the flow of the melted material out of the furnace at a consistent rate. The exit port of the furnace may be a bushing comprising a plurality of orifices for producing a like plurality of continuous fibers from molten glass, or a single orifice producing a flowing stream of melted glass for attenuation into discontinuous fibers.

A description of the continuous fiber producing process is provided in U.S. Pat. No. 3,265,476. A description of a discontinuous fiber forming process is shown in U.S. Pat. No. 3,560,179.

The quality and particularly the size of the fiber produced is a function of the rate at which the melted material issues from the exit port, whether from a single orifice for forming discontinuous fibers or from a plurality of orifices for forming a number of continuous filaments. However, in either case, a continuous or discontinuous fibers may be formed from a single or a plurality of orifices.

The flow rate depends on the hydraulic head within the furnace. This hydraulic head is, in turn, dependent on the level of melted material, the temperature and the viscosity of the material, the rate of material inflow in the form of dry batch particulate material, such as powdered or granular material, and the rate of heat applied to the furnace for converting the state of the dry batch to melted liquid.

It has been found that when the furnace has been adjusted for a desired flow through the furnace, based upon empirically determined operating conditions, such as furnace temperature and batch crust thickness, the hydraulic head and the flow of material out of the furnace can be fine tuned or adjusted by controlling the rate of dry batch material added to the furnace and the amount of power applied to the furnace for melting the batch material. By maintaining the batch crust level at a thickness consistent with a hydraulic head for a desired flow rate, the quality of the fibers can be maintained.

It has been found that this crust level may be maintained by sensing the temperature below the crust as an indication of batch crust thickness. The batch crust acts as an insulator and the temperature below the crust is at a consistent level for a consistent batch thickness, assuming all other conditions in the furnace remain the same. When the crust thickness increases, the heat below the crust increases as the insulating quality of the crust level increases. As the batch crust thickness decreases, the insulating quality of the crust decreases and the temperature below the crust decreases.

In a balanced furnace, where the hydraulic head produces the desired flow through the furnace, the batch crust thickness may be measured by sensing the temperature immediately below the batch crust, and by sensing the furnace temperature as an indication of viscosity, flow through the furnace, and the rate of transformation of dry crust into its liquid state.

The viscosity and rate of flow can be correlated to the hydraulic head within the furnace and the thickness of the batch crust. This correlation can be done empirically for specific batch mixes and glass compositions. Once the correlation between temperature and hydraulic head is established, then a suitable conversion factor can be inserted within a controller to produce a signal corresponding to the hydraulic head within the furnace and derived from the temperature.

The controller can then provide a signal which, in turn, controls the amount of heat to the screen heater to control the temperature and the hydraulic head.

Accordingly, the rate of batch feed into the furnace, and melt flow out of the furnace and their effect on the hydraulic head for a particular glass composition, and operating temperature, can be empirically determined and correlated to the hydraulic head.

Accordingly, a constant can be derived, converting the temperature measured at the crust area and in the interface zone to the hydraulic head. A controller can be programmed to make a suitable conversion to produce a signal responsive to that temperature and to regulate the rate of batch feed into the entrance port.

As shown in the drawings, a first temperature sensor 19 is placed under the layer immediately below the crust layer and in the interface 15 or immediately below it in the liquid area. The output of this temperature sensor is provided on lead 21 to a controller 27 which provides an appropriate output signal responsively to the means 1 for feeding batch, to either increase or decrease the batch feed rate.

Additionally, a second temperature sensor 23 is placed within the furnace in the liner area 5, immediately below the screen heater 9, to sense the temperature of the melted liquid at that point. The temperature sensor 23 is shown in the preferred embodiment immediately adjacent the screen heater 9 so that the closed loop providing power to the screen heater may be most responsive to the temperature at the screen heater. However, it should be recognized that that temperature sensor can be placed anywhere in the furnace liner 5. The output of the temperature sensor 23 is provided on lead 25 to a controller 27 which, in turn, provides a control signal to the batch feeder. Any suitable controller programmed in accordance with the flow charts of FIGS. 2, 3 and 4 may be used, as is apparent to one skilled in the art.

Figure 2:
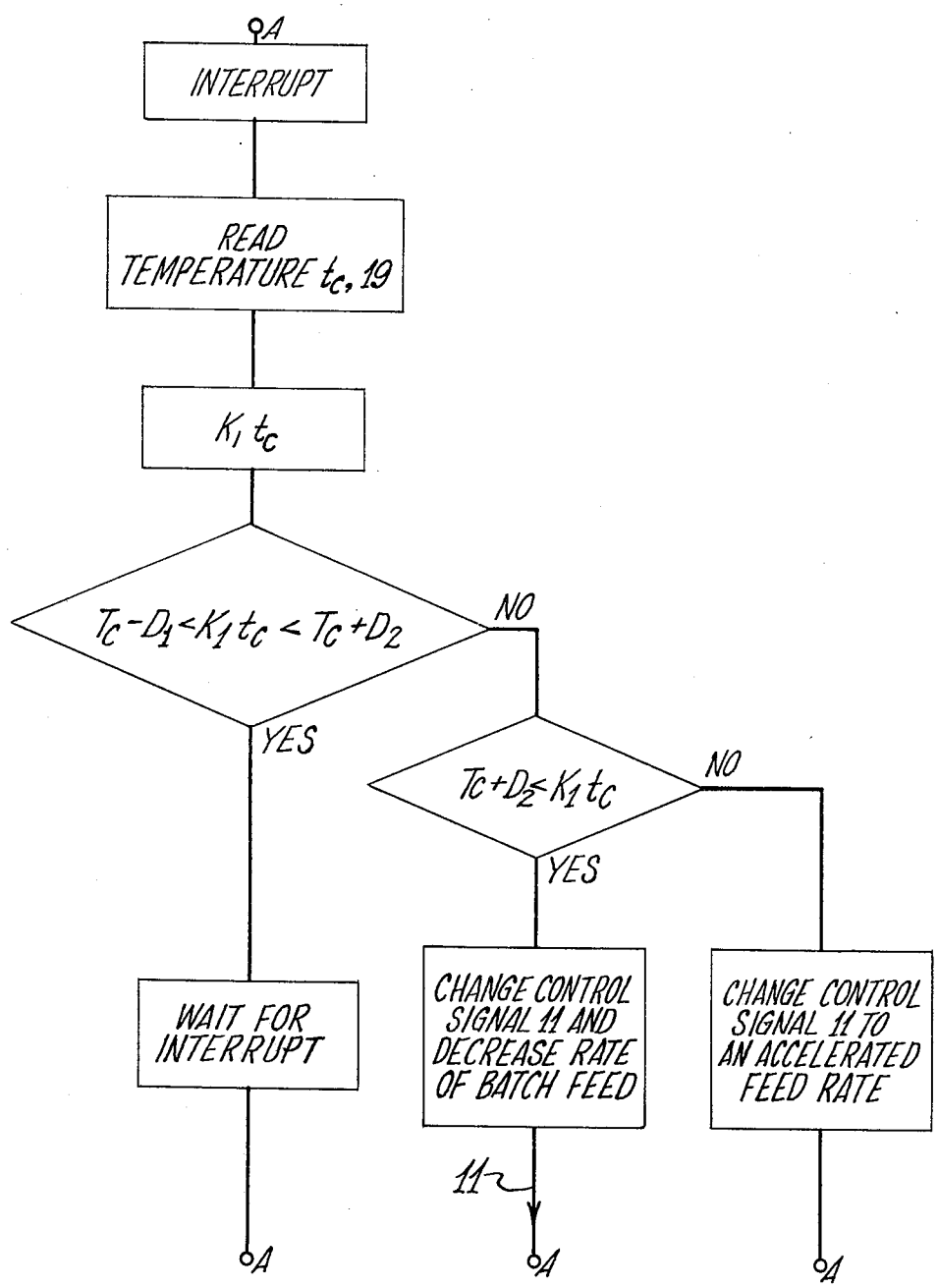
FIG. 2 is a flow chart of the process for controlling the rate of solid material feed responsive to the temperature sensed at the crust.

A flow chart for controlling the hydraulic head with respect to the temperature at the crust is shown in FIG. 2. A suitable controller in this process may be an analog or digital device. For the purposes of the flow charts of FIGS. 2, 3 and 4, a digital device will be assumed.

As shown in FIG. 2, a signal $t_c$ responsive to the temperature at the crust area is provided to the controller. The controller then evaluates the signal to ascertain if the signal is within the operating range or above or below the predetermined range limit.

This evaluation is accomplished by conditioning the temperature by a suitable constant $K_1$, comparing this new signal to a standard $T_c$. If the conditioned signal is greater than $T_c + D_2$, then an appropriate signal is transmitted to the means for feeding batch. Accordingly, if the signal is less than $T_c - D_1$, a similar suitable signal is sent to the means for feeding batch. $D_1$ and $D_2$ are permissible temperature deviations for $T_c$.

The control signal to the means for feeding batch may be a step signal responsive to the temperature levels, or may be a continuous signal proportional to the temperature signal, or may be a discontinuous function of the temperature, as is well known in the art.

In this mode, batch is added at a faster rate when the temperature at the crust area decreases, ($K_1T_c < T_c - D_1$) indicating that crust is used up and the insulating quality of the crust is lost. The rate of feed of the batch is decreased when the temperature at the crust area increases ($T_c + D_2 < K_1T_c$) indicating that an excessive level of crust has built up and must be reduced.

Figure 3:
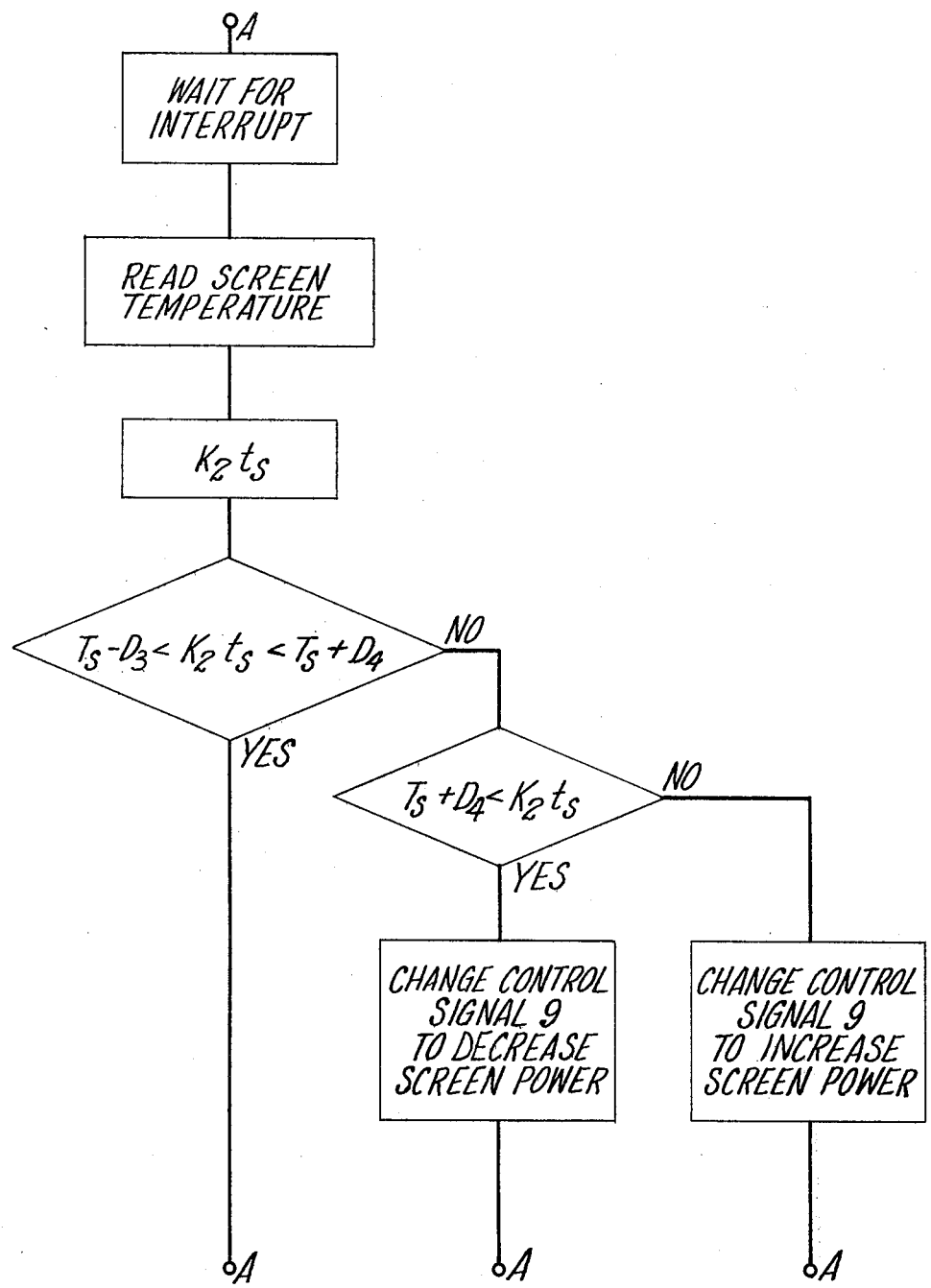
FIG. 3 is a flow chart for controlling the power to the heating screen as a function of the temperature sensed at the screen heater.

Referring now to FIG. 3, the flow chart for the method of regulating the hydraulic head responsive to the temperature of the fluid at the screen heater is shown. As shown in FIG. 3, a signal $t_s$ indicative of the temperature immediately below the screen heater is sensed and provided to the controller. The controller conditions this signal by a suitable constant, correlating it to the viscosity of the fluid at the screen heater and a measure of the hydraulic head. This signal is then translated by the controller to a control signal which is transmitted to the means supplying power to the screen electrode, and which reduces or increases the power accordingly. In this regard, the power will be decreased where the temperature is above a standard, and increased when the temperature is below a standard.

As in the case of the crust temperature, the evaluation is accomplished by conditioning the sensed screen temperature $t_s$ by a suitable constant $K_2$, comparing this new signal to a standard $T_s$. If the conditioned signal is greater than $T_s + D_4$ or less than $T_s - D_3$, where $D_3$ and $D_4$ are permissible temperature deviations, then an appropriate signal is provided from the controller to the screen heater power supply.

As in the case above, where the temperature at the crust is measured, this control signal may be a step output signal responsive to predetermined temperature limits, or may be a continuous proportional function of the temperature at the screen area, or may be a discontinuous function.

The screen power is reduced responsively to a temperature higher than the standard and increased responsively to a temperature lower than the standard.

Figure 4:
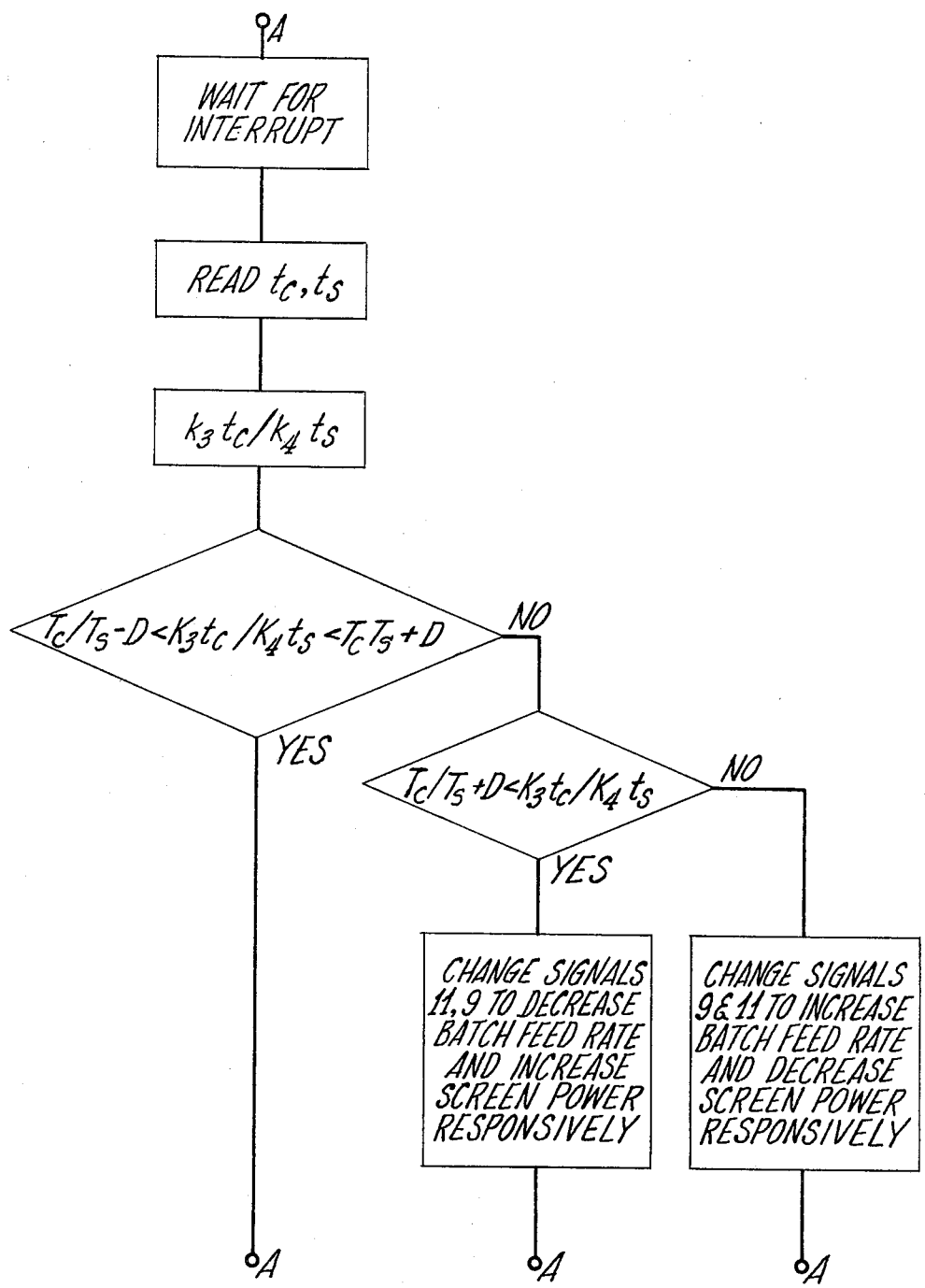
FIG. 4 is a flow chart of the combined use of the two sensed temperatures at the crust and at the heating screen to cooperatively control the hydraulic head.

FIG. 4 shows the manner in which the two temperature sensors may be used cooperatively to control the hydraulic head.

Additionally, the two methods may be used separately as shown in FIGS. 2 and 3, either concurrently or alternately.

As shown in FIG. 4, two temperatures are taken—one at the crust area, as shown in FIG. 2, and one in the screen area shown in the flow chart of FIG. 3.

The controller conditions these signals by two constants, $K_3$ and $K_4$, which weighs the contribution of each of the temperatures and provides a suitable conditioned signal $K_3t_c/K_4t_s$ corresponding to the hydraulic head.

The controller then provides an output signal corresponding to the conditioned signal $K_3t_c/K_4t_s$ to control the rate of feed of the batch and the power to the heater.

In this manner of operation, as shown in FIG. 4, one of the two parameters—either the rate of batch feed or the power to the heater—may be varied and weighted to have the greatest contribution to controlling the hydraulic head, and the other may be used to modulate the principal means of control. The temperatures may be used independently and alternately or simultaneously to control the hydraulic head. Or the temperatures may be combined to produce one temperature signal $K_3t_c/K_4t_s$, as in FIG. 4. The controller may employ the relation $T_s/T_c - D < K_3t_c/K_4t_s < T_s/T_c + D$, where D is a permissible temperature deviation, to provide the control signal.

The batch input rate may be used as a coarse control over the hydraulic head, while the power supply to the screen heater may be used as a fine control over the hydraulic head, or viice versa.

The constants $K_1$, $K_2$, $K_3$, $K_4$, as well as the mathematical function $K_3t_c/K_4t_s$, are derived empirically as they are dependent upon batch mix, output flow rate, outlet port or bushing size.

I claim:

1. A method of controlling the thickness of the batch material in an electric furnace, said method comprising the steps of: (a) feeding batch material to a furnace; (b) supplying electrical power to melting means located in said furnace; (c) sensing the temperature beneath the batch material and generating a first signal responsive thereto; (d) sensing the temperature of the molten material proximate said melting means and generating a second signal responsive thereto; (e) modifying the rate at which batch material is fed to said furnace responsive to said first signal; and (f) modifying the amount of power supplied to said melting means responsive to said second signal.

2. A method as recited in claim 1, wherein said step of modifying the batch feed rate comprises: (a) comparing said first signal with a first reference signal; (b) increasing the batch feed rate if said first signal is less than said first reference signal; and (c) decreasing the batch feed rate if said first signal is greater than said first reference signal.

3. A method as recited in claims 1 or 2, wherein said step of modifying the power comprises: (a) comparing said second signal with a second reference signal; (b) increasing the amount of power supplied to said melting means if said second signal is less than said second reference signal; and (c) decreasing the amount of power supplied to said melting means if said second signal is greater than said second reference signal.

4. A method as recited in claim 1, wherein said step of modifying the batch feed rate comprises: (a) determining if said first signal is within a first predetermined range; (b) decreasing the batch feed rate if said first signal is greater than the maximum point of said first predetermined range; and (c) increasing the batch feed rate if said first signal is less than the minimum point of said first predetermined range.

5. A method as recited in claims 1 or 4, wherein said step of modifying the power comprises: (a) determining if said second signal is within a second predetermined range; (b) decreasing the amount of power supplied to said melting means if said second signal is greater than the maximum point of said second predetermined range; and (c) increasing the amount of power supplied to said melting means if said second signal is less than the minimum point of said second predetermined range.

6. A method of controlling the thickness of the batch material in an electric furnace, said method comprising the steps of: (a) feeding batch material to a furnace; (b) supplying electrical power to melting means located in said furnace; (c) sensing the temperature beneath the batch material and generating a first signal responsive thereto; (d) sensing the temperature of the molten material proximate said melting means and generating a second signal responsive thereto; (e) generating a third signal as a function of said first and second signals; (f) comparing said third signal with a reference signal to generate a fourth signal; (g) modifying the batch feed rate and the amount of power supplied to said melting means as a function of said fourth signal.

7. A method of controlling the thickness of the batch material in an electric furnace, a method comprising the steps of: (a) feeding batch material to a furnace; (b) supplying electrical power to melting means located in said furnace; (c) sensing the temperature beneath the batch material and generating a first signal responsive thereto; (d) sensing the temperature of the molten material proximate said melting means and generating a second signal responsive thereto; (e) generating a third signal as a function of said first and second signals; (f) determining if said third signal is within a predetermined range; (g) decreasing the batch feed rate and decreasing the amount of power supplied to said melting means as a function of said third signal, if said third signal is greater than the maximum point of said range; and (h) increasing the batch feed rate and increasing the amount of power supplied to said melting means as a function of said third signal, if said third signal is less than the minimum point of said range.

8. An apparatus for controlling the thickness of the batch material in an electric furnace, said apparatus comprising: (a) a container adapted to hold molten material; (b) means for feeding batch material to said container; (c) means for melting said batch material, said melting means being located in said container; (d) means for supplying electrical power to said melting means; (e) means for sensing the temperature beneath the blanket of batch and generating a first signal responsive thereto; (f) means for sensing the temperature of the molten material proximate said melting means and generating a second signal responsive thereto; (g) means responsive to said first signal for modifying the rate at which said batch feeding means feeds batch material to said furnace; and (h) means responsive to said second signal for modifying the amount of power supplied to said melting means.

9. An apparatus as recited in claim 8, wherein said means for modifying the batch feed rate comprises: first means for comparing said first signal with a first reference signal and means responsive to said first comparing means for increasing the batch feed rate if said first signal is less than said first reference signal and decreasing the batch feed rate if said first signal is greater than said first reference signal.

10. An apparatus as recited in claims 8 or 9, wherein said means for modifying the power supplied to said melting means comprises: (a) second means for comparing said second signal with a second reference signal and means responsive to said second comparing means for increasing the power supplied to said melting means if said second signal is less than said second reference signal and decreasing the power supplied to said melting means if said second signal is greater than said second reference signal.

11. An apparatus as recited in claim 8, wherein said means for modifying the batch feed rate comprises: first means for determining if said first signal is within a first predetermined range and means responsive to said first determining means for decreasing the batch feed rate if said first signal is greater than the maximum point of said first predetermined range and for increasing the batch feed rate if said first signal is less than the minimum point of said first predetermined range.

12. An apparatus as recited in claims 8 or 11, wherein said means for modifying the amount of power supplied to said melting means comprises: second means for determining if said second signal is within a second predetermined range and means responsive to said second determining means for decreasing the amount of power supplied to said melting means if said second signal is greater than the maximum point of said second predetermined range and increasing the amount of power supplied to said melting means if said second signal is less than the minimum point of said second predetermined range.

13. An apparatus for controlling the thickness of the batch material in an electric furnace, said apparatus comprising: (a) a container adapted to hold molten material; (b) means for feeding batch material to said container; (c) means for melting said batch material, said melting means being located in said container; (d) means for supplying electrical power to said melting means; (e) means for sensing the temperature beneath the batch material and generating a first signal responsive thereto; (f) means for sensing the temperature of the molten material proximate said melting means and generating a second signal responsive thereto; (g) means for generating a third signal as a function of said first and second signals; (h) means for comparing said third signal with a reference signal to generate a fourth signal; (i) means for modifying the batch feed rate and the amount of power supplied to said melting means as a function of said fourth signal.

14. An apparatus for controlling the thickness of the batch material in an electric furnace, said apparatus comprising: (a) a container adapted to hold molten material; (b) means for feeding batch material to said container; (c) means for supplying electrical power to melting means located in said container; (d) means for sensing the temperature beneath the batch material and generating a first signal responsive thereto; (e) means for sensing the temperature of the molten material proximate said melting means and generating a second signal responsive thereto; (f) means for generating a third signal as a function of said first and second signals; (g) means for determining if said third signal is within a predetermined range; (h) means for decreasing the batch feed rate and decreasing the amount of power supplied to said melting means as a function of said third signal, if said third signal is greater than the maximum point of said range; and (i) means for increasing the batch feed rate and increasing the amount of power supplied to said melting means as a function of said third signal, if said third signal is less than the minimum point of said range.

* * * * *

UNITED STATES PATENT AND TRADEMARK OFFICE
CERTIFICATE OF CORRECTION

PATENT NO. : 4,262,158
DATED : April 14, 1981
INVENTOR(S) : Francis L. Lynch

It is certified that error appears in the above—identified patent and that said Letters Patent is hereby corrected as shown below:

At column 3, line 27, the word "a" should be deleted.

At column 5, line 3, the equation should be changed to read:
$$(K_1 t_c < T_c - D_1)$$

At column 5, line 6, the equation should be changed to read:
$$(T_c + D_2 < K_1 t_c)$$

At column 6, line 6, the word "viice" should be changed to "vice"

Signed and Sealed this

Twenty-third Day of June 1981

[SEAL]

Attest:

RENE D. TEGTMEYER

Attesting Officer     Acting Commissioner of Patents and Trademarks